United States Patent
Scholz

(10) Patent No.: US 9,632,510 B2
(45) Date of Patent: Apr. 25, 2017

(54) ACTUATING DEVICE FOR ADJUSTING A MOVABLE VEHICLE PART AND METHOD FOR OPERATING SAME

(71) Applicant: BROSE FAHRZEUGTEILE GMBH & CO. KOMMANDITGESELLSCHAFT, BAMBERG, Bamberg (DE)

(72) Inventor: Marcus Scholz, Lichtenfels (DE)

(73) Assignee: Brose Fahrzeugteile GmbH & Co. Kommanditgesellschaft, Bamberg, Bamberg (DE)

(*) Notice: Subject to any disclaimer, the term of this patent is extended or adjusted under 35 U.S.C. 154(b) by 0 days.

(21) Appl. No.: 14/654,607

(22) PCT Filed: Dec. 18, 2013

(86) PCT No.: PCT/EP2013/077105
§ 371 (c)(1),
(2) Date: Sep. 30, 2015

(87) PCT Pub. No.: WO2014/096012
PCT Pub. Date: Jun. 26, 2014

(65) Prior Publication Data
US 2016/0077528 A1    Mar. 17, 2016

(30) Foreign Application Priority Data
Dec. 20, 2012   (DE) .................. 10 2012 024 902

(51) Int. Cl.
*B60R 22/00*     (2006.01)
*G05D 3/00*      (2006.01)
(Continued)

(52) U.S. Cl.
CPC .................. *G05D 3/00* (2013.01); *B60J 1/17* (2013.01); *E05F 15/695* (2015.01);
(Continued)

(58) Field of Classification Search
USPC .......................................... 701/49
See application file for complete search history.

(56) References Cited

U.S. PATENT DOCUMENTS 5,668,451 A    9/1997   Driendl et al.
6,114,822 A    9/2000   Ubelein et al.
(Continued)

FOREIGN PATENT DOCUMENTS

CN    1380995 A    11/2002
CN    102472633 A   5/2012
(Continued)

*Primary Examiner* — Hussein A. Elchanti
(74) *Attorney, Agent, or Firm* — Laurence A. Greenberg; Werner H. Stemer; Ralph E. Locher

(57) ABSTRACT

In order to be able to precisely approach a target position of a movable vehicle part by way of a motorized actuator using simple features, an actuating motor of the actuator is stopped by a predetermined advancing lead before the target position is reached. The advancing lead is varied here depending on the rotational speed of the motor or an actuating speed measurement variable correlated therewith and depending on a temperature measurement variable characteristic of the ambient temperature of the actuator.

3 Claims, 2 Drawing Sheets

(51) Int. Cl.
*E05F 15/695* (2015.01)
*B60J 1/17* (2006.01)

(52) U.S. Cl.
CPC ..... *E05Y 2400/34* (2013.01); *E05Y 2400/354* (2013.01); *E05Y 2900/55* (2013.01)

(56) References Cited

U.S. PATENT DOCUMENTS

| | | | |
|---|---|---|---|
| 6,555,978 B1* | 4/2003 | Castellon | H02H 7/0851 318/266 |
| 9,109,924 B2 | 8/2015 | Vetter | |
| 2002/0152013 A1 | 10/2002 | Knab et al. | |
| 2003/0225497 A1* | 12/2003 | Whinnery | G05B 19/232 701/49 |
| 2006/0000558 A1* | 1/2006 | Fennell | E06B 9/42 160/7 |
| 2008/0110092 A1* | 5/2008 | Takahashi | E05F 15/695 49/28 |
| 2015/0048764 A1* | 2/2015 | Binfet | E05F 15/695 318/283 |

FOREIGN PATENT DOCUMENTS

| | | |
|---|---|---|
| CN | 102785556 A | 11/2012 |
| DE | 100 26 991 A1 | 12/2001 |
| JP | 2001014002 A | 1/2001 |

\* cited by examiner

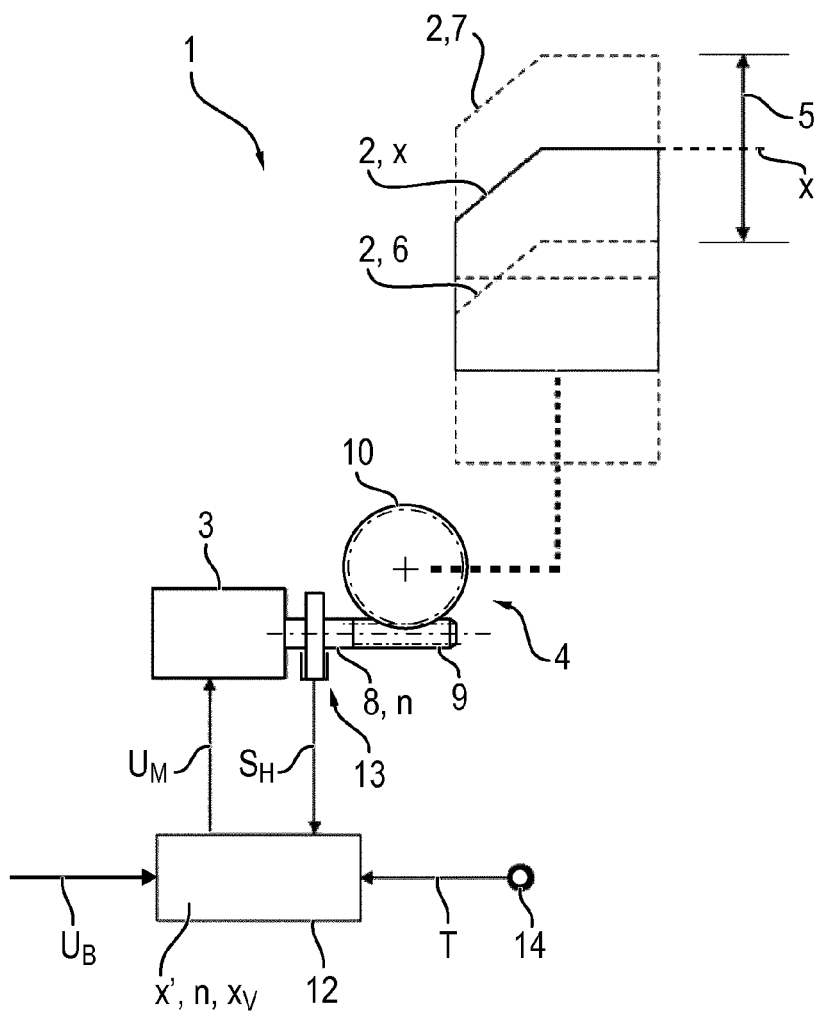
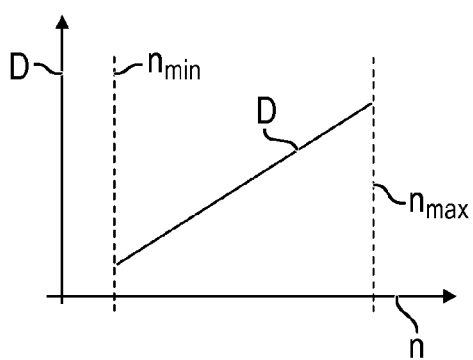
FIG. 2
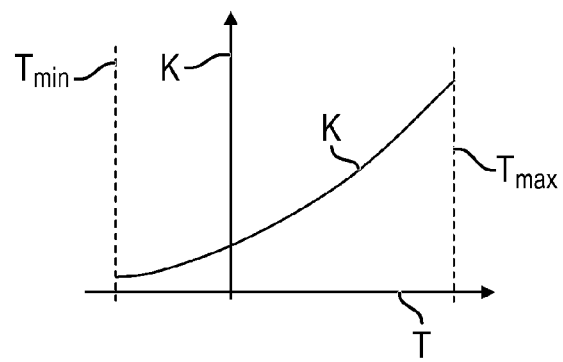
FIG. 3
FIG. 1

ACTUATING DEVICE FOR ADJUSTING A MOVABLE VEHICLE PART AND METHOD FOR OPERATING SAME

BACKGROUND OF THE INVENTION

Field of the Invention

The invention concerns a method for operating a motorized actuating device for a movable vehicle part. The invention also concerns an associated actuating device for adjusting the vehicle part. The vehicle part to be adjusted is in particular a vehicle window pane, the actuating device being in particular an electric motor window lifter.

Precise adjustment of the actuating position is often necessary or at least desirable with a motorized movable vehicle part. Thus inaccurate positioning of a vehicle window pane is a significant disadvantage for example for the so-called short-stroke function with which the window pane is moved away from the upper door seal of a frameless vehicle door in order to enable resistance-free opening of the vehicle door. Narrow limits are often set for the short stroke movement by the vehicle manufacturer. This ensures that on the one hand the window pane is fully moved away from the window seal, but that on the other hand the window pane is not too far open following the short stroke, since otherwise according to the applicable legal requirements for returning the window pane sometimes additional safety provisions such as for example an automatic anti-trapping means are required.

A precise approach is however also desirable for other actuating positions of a window pane, in particular when approaching the lower or upper preliminary switching point, at which the window pane is usually stopped shortly before it actually reaches the (lower or upper) blocking condition. Moreover, precise positioning of a window pane is also desirable for example during the approach to the so-called RELAN (Relax After Normalization) point. The window pane position to which the window pane is frequently returned to relieve the load on the actuating mechanism following an adjustment movement to the lower or upper blocking condition is referred to as the RELAN point.

Precise adjustment of the actuating position is also desirable for other special window pane positions (for example an automatically adjusted "smoking gap") for aesthetic reasons. In addition, a precise actuating position setting is also advantageous for other actuating devices in a vehicle, in particular seat adjusters, door and hood adjusters, etc.

BRIEF SUMMARY OF THE INVENTION

The object of the invention is to ensure particularly precise adjustment of the actuating position of the vehicle part to be adjusted for an actuating device of the aforementioned type with a simple means.

Regarding a method for operating a motorized actuating device for a movable vehicle part, the object is achieved according to the invention by the claimed features. Regarding the actuating device, the object is achieved according to the invention by the claimed features. Regarding a control unit for activating the electric motor of an actuating device and regarding a computer program product—provided for implementation in such a control unit—the above object is further achieved according to the invention by the claimed features. Embodiments and developments of the invention that are advantageous and partly inventive in themselves are set out in the dependent claims and the subsequent description. The vehicle part to be adjusted is also referred to below as an "actuating element".

According to the method, the actuating motor of the actuating device is stopped during an actuation process at a predetermined lead prior to reaching a target position of the actuating element—by switching off the electrical operating voltage that is fed to it. Thus in other words the actuating motor is already switched off at a point in time at which the actuating element is still at the distance of the lead from its target position.

The term "lead" thus refers to the actuating displacement interval by which the stopping point (switch-off position) of the actuating motor differs from the desired target position of the actuating element. The magnitude of the lead can optionally be related here to the actual actuation distance covered by the actuating element and—in the case of a window pane to be adjusted—can thus be specified in units of millimeters or centimeters of the pane displacement for example. Alternatively, the lead can also be expressed in units of a variable that has a definite (linear or non-linear) relationship to the travelled actuation distance of the actuating element. Thus within the scope of the invention the lead can for example also be specified in relation to the rotation angle by which the motor shaft of the actuating motor rotates to achieve the corresponding feed of the actuating element (for example by the number of quarter revolutions the motor shaft). With another alternative, the lead can also be specified within the scope of the invention in relation to the period of time required for the actuating motor to adjust the actuating element by the appropriate actuation distance interval.

According to the invention, the lead is not predetermined as a fixed value. Rather, on the one hand the lead is varied depending on the revolution rate of the motor or on an actuation rate measurement variable correlated therewith. On the other hand, according to the invention the lead is also varied depending on a temperature measurement variable that is characteristic of the ambient temperature of the actuating device.

A variable that has a definite (linear or not-linear) functional relationship to the revolution rate of the motor is referred to here as an "actuation rate measurement variable". Within the scope of the invention, in particular the measured battery voltage of the vehicle is used as an indirect "actuation rate measurement variable", which determines the value of the operating voltage for the motor and hence the revolution rate of the motor. Within the scope of the method according to the invention, the "temperature measurement variable" can optionally specify the external temperature in the surroundings of the vehicle, the temperature in the interior of the vehicle or for example the temperature of a vehicle part. Instead of a direct temperature specification, within the scope of the invention the temperature measurement variable can also be a variable with a definite (linear or non-linear) functional relationship to the measured temperature.

The invention is based on the consideration that inaccuracies in the actuation position adjustment are primarily caused by the fact that the actuating motor and the actuating element do not stop instantaneously with the switch-off of the operating voltage, but initially continue to move because of their mechanical inertia. Said further movement is below as "overrun" and is intended to be optimally compensated by the lead provided according to the method.

It is known that the overrun essentially depends on the revolution rate of the actuating motor and the kinetic energy caused thereby. As a rule the overrun is thus generally the greater, the faster the actuating motor rotates to the stopping point (switch-off point in time).

However, it is known that taking into account the revolution rate of the motor alone is not sufficient to accurately predict the end position at which the actuating element actually comes to rest following the switch-off of the actuating motor. Rather, said end position also depends on the mechanical play of the actuating device and the actuating resistance opposing the displacement of the actuating element. It has been shown here that the latter two influences can be simply yet precisely taken into account within the scope of the invention by means of an—empirically determinable—temperature dependency of the lead. The method according to the invention is thus characterized by high precision in the adjustment of a desired target position, but is particularly easy to implement at the same time.

In an advantageous development of the invention, the actuation direction in which the actuating element is moving is taken into account in addition to the revolution rate of the motor (or other actuation rate measurement variable) and the temperature measurement variable. This takes into account the fact that the overrun of the actuating element is in practice also partly significantly dependent on the direction of the actuation movement. It is known that this concerns to a significant extent actuating devices for actuating elements whose actuation path is oriented exactly vertically or at least has a vertical component of motion. This also includes, besides window lifters, for example actuating devices for automatically opening vehicle trunk lids, backrests, etc. In addition, the displacement of the actuating element following the switch-off of the actuating motor is also influenced here by the dead weight of the actuating element. Thus when raising the actuating element work has to be done against the dead weight of the actuating element. The actuating element only has a small tendency to overrun in this case, since the mechanical inertia of the actuating element is wholly or partly compensated by the opposing gravitational force. When lowering the actuating element, by contrast the mechanical inertia and the gravitational force of the actuating element act in the same direction, so that the overrun of the actuating element is frequently significantly greater in this case.

It is known that the actuation direction-dependent tendency to overrun correlates strongly with the temperature dependency of the overrun. With a window pane for example, it is significant that the running resistance of the window pane is strongly influenced by the window seal and reduces significantly with increasing temperature of the seal.

In one version of the method that is aimed at the adjustment of a (exactly or partly) vertically movable actuating element, it is provided that when lowering the actuating element the lead is increased by a correction factor compared to the lead value that is provided for lifting—under otherwise identical conditions. The correction factor is variably amended here depending on the temperature measurement.

The actuating device comprises an electrical actuating motor, an actuating mechanism as well as a control unit. The actuating mechanism is used here for drive technology coupling of the actuating motor to the actuating element. The control unit is again used for activating the actuating motor.

According to the invention, the control unit is configured here in terms of programming and/or circuitry for the automatic performance of the method according to the invention, in particular in one of the embodiment versions described above. In a preferred embodiment, the control unit is formed by a microcontroller, at least in its core, in which the method according to the invention is programmatically implemented in the form of operating software (firmware), so that the method is automatically performed when executing the operating software in the microcontroller. Alternatively however, for this purpose the control unit can also be formed within the scope of the invention by a (non-programmable) hardware circuit, in which the functionality for automatically performing the method is implemented in circuitry.

Embodiments of the invention are also a control unit of the aforementioned type as such, i.e. without the other components of the actuating device and a computer program product.

According to the invention, the control unit is—as described above—configured in circuitry terms and/or programmatically to automatically perform the method according to the invention, in particular in one of the embodiment versions described above.

The computer program product comprises computer-readable instructions, with the execution of which the method according to the invention is automatically performed, in particular in one of the embodiment versions described above. The computer program product is designed in this case for execution in the control unit of a motorized actuating device of the aforementioned type, wherein the control unit is formed by or at least comprises a microcontroller for this.

The actuating device is preferably an electric motor window lifter for adjusting a vehicle window pane. The invention is in principle also applicable to other motorized vehicle actuating devices, for example to a seat adjuster, a door adjuster or a roof adjuster.

For requesting the temperature measurement variable, in particular a value of the external or internal temperature, the control unit can preferably be coupled to the central on-board electronics, in particular the on-board computer of the vehicle. Alternatively, within the scope of the invention the actuating device can also comprise a dedicated temperature sensor for this purpose that directly ascertains the temperature measurement variable and feeds it to the control unit.

The method according to the invention is intended for use in particular when approaching the short-stroke position of the window lifter. The method is also advantageous for the adjustment of other specified actuating positions, in particular for actuating positions that can be approached from both actuating directions.

BRIEF DESCRIPTION OF THE SEVERAL VIEWS OF THE DRAWING

An exemplary embodiment of the invention is explained in detail below using figures. In the figures:

FIG. 1 shows in a schematic representation a window lifter with an electrical actuating motor, an actuating mechanism, by means of which the actuating motor is coupled to a (vehicle) window pane, as well as to a control unit for activating the actuating motor, FIG. 2 shows, in a schematic diagram against the revolution rate of the actuating motor, a revolution rate-dependent base term of a lead by which the control unit stops the actuating motor before reaching the target position, FIG. 3 shows, in a schematic diagram against the external temperature of the vehicle, a temperature-dependent correction term by which the control unit increases the lead when lowering the window pane.

DESCRIPTION OF THE INVENTION

Figure 4:
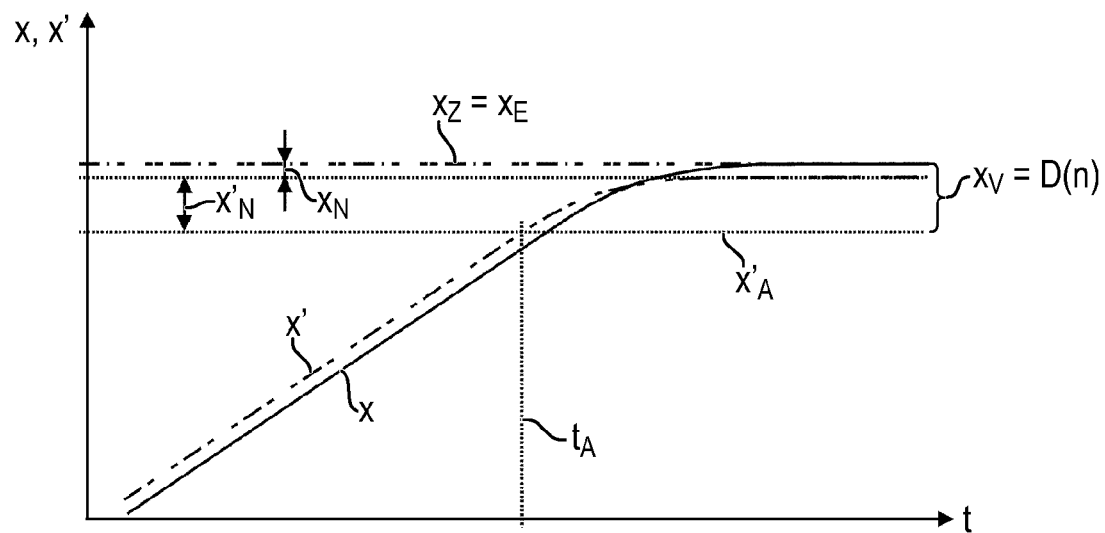
FIG. 4 shows, in a schematic diagram against time, the profile of the physical actuating position of the window pane (solid line) in comparison with a logical actuating position proportional to the number of revolutions of the motor (dashed line) when lifting the window pane.

Mutually corresponding parts and variables are always provided with the same reference characters in all figures.

FIG. 1 shows schematically an actuating device in the form of a window lifter 1 for a (vehicle) window pane 2 of a motor vehicle.

The window lifter 1 comprises an electrical actuating motor 3 that is mechanically coupled by means of an actuating mechanism 4 to the window pane 2 such that the window pane 2 can be reversibly displaced by the actuating motor 3 along an actuation path 5 between two end positions, namely an open position 6 and a closed position 7.

FIG. 1 shows the window pane 2 in the open position 6 and the closed position 7 with dashed contour lines in each case. The window pane 2 is shown with a solid contour line in an actuating position x between the two end positions. The actuating position x has for example the value zero if the window pane 2 is in the open position 6.

The actuating mechanism 4 comprises a drive worm 9 attached to a motor shaft 8 of the actuating motor 3, which meshes with a worm wheel 10. The actuating mechanism 4 also comprises further components (not shown in detail), for example a control cable, by means of which the worm wheel 10 is coupled to the window pane 2.

The actuating device 1 also comprises a control unit 12 in the form of a microcontroller as well as an angular position sensor 13. The angular position sensor 13 comprises a multi-pole ring magnet that is rotationally fixedly attached to the motor shaft 8 as well as a Hall sensor working in conjunction with the ring magnet. During the operation of the actuating motor 3, the ring magnet rotating together with the motor shaft 8 relative to the Hall sensor generates in conjunction with the Hall sensor a periodically oscillating pulse signal $S_H$ that is fed to the control unit 12 by the angular position sensor 13 as an input variable.

During the running actuation process the control unit 12 calculates a variable, which is referred to below as the rotation angle, that is proportional to the number of revolutions of the motor shaft 8 by counting the (Hall) pulses of the pulse signal $S_H$. By summing the rotation angle with a stored initial value, the control unit 12 calculates a time-dependent logical actuating position of the window pane 2, which is referred to below as the actuating position measurement x'. In addition to the actuating position measurement x', the control unit 12 calculates the revolution rate n of the motor shaft 8 by counting the pulses of the control signal $S_H$ per time unit or by measuring the interpulse times.

A (temperature) measurement value T is also fed to the control unit 12 that is characteristic of the ambient temperature of the window lifter 1 (in this case the external temperature of the vehicle). In the example shown the temperature measurement value T is detected by a temperature sensor 14 associated with the window lifter 1. Alternatively, the temperature measurement value T can also be obtained by central on-board electronics of the motor vehicle.

The control unit 12 controls the actuating motor 3 by applying an electrical operating voltage $U_M$ (motor voltage). For its part the control unit 12 is supplied with an electrical battery voltage $U_B$ by a vehicle battery.

In order to prevent the window pane 2 from running past a target position $x_Z$ (FIG. 4,5) to be set because of the mechanical inertia of the overall system formed by the window lifter 1 and the window pane 2 during an actuation process, the control unit 12 stops the actuating motor 3 (by switching off the operating voltage $U_M$) before the window pane 2 has actually reached the target position $x_Z$. The actuating position measurement x' at which the control unit 12 switches off the actuating motor 3 is referred to for this as the switch-off position $x'_A$ (FIG. 4,5). The switch-off position $x'_A$ is given here by subtracting a predetermined lead $x_V$ (FIG. 4,5) from the target position $x_Z$:

$$x'_A = x_Z - s x_V$$

By multiplying the lead $x_V$ by a direction variable s, which has the value +1 when lifting the window pane 2 and has the value −1 when lowering the window pane 2, it is ensured in the above equation that the lead $x_V$ is regarded as negative when lowering.

The control unit 12 variably determines the lead $x_V$ from a revolution rate-dependent base term D (D=D(n)) and a temperature-dependent correction term K (K=K(T)). The control unit 12 additionally takes the actuation direction into account during the determination of the lead $x_V$ by only using the correction term K when lowering the window pane 2. By contrast, when lifting the window pane 2 the control unit 12 determines the lead $x_V$ exclusively from the base term D:—

$$x_v = \begin{cases} D(n) & \text{lifting} \\ D(n) + K(T) & \text{lowering} \end{cases}$$

The control unit 12 thus selects the lead $x_V$—under otherwise corresponding conditions, i.e. for the same values of the revolution rate n and the temperature measurement variable T—to be greater by a correction term K when lowering the window pane 2 than when lifting.

An exemplary profile of the base term D and of the correction term T is plotted in FIGS. 2 and 3 against the revolution rate n (in stationary operation of the window lifter 1) or against the temperature measurement variable T.

It can be seen here from FIG. 2 that the value of the base term D increases approximately linearly with the revolution rate n between limit values $n_{min}$ and $n_{max}$, between which the revolution rate n typically lies within the steady state mode of the window lifter 1. Instead of being plotted against the revolution rate n, the base term D can equivalently also be plotted against the battery voltage $U_B$, since the revolution rate n that is set during steady state operation of the window lifter 1 correlates with the battery voltage $U_B$.

It is also shown in FIG. 3 that the correction term K increases continuously in a permissible temperature range between temperature limits $T_{min}$ and $T_{max}$.

The respective profiles of the base term D and of the correction term K are preferably determined empirically using laboratory tests on at least one test example of the window lifter 1 while varying the ambient temperature and the battery voltage $U_B$. In a developed embodiment of the invention, the base term D and/or the correction term K are defined with an additional dependency on a characteristic dependency on the age of the window lifter 1. For example, the base term D and the correction term K are increased linearly with the number of load cycles performed by means of the window lifter 1. In addition or alternatively to said age dependency, the correction term K can also be stored with its own dependency on the revolution rate n. The base term D and the correction term K are preferably stored in the control unit 12 as mathematical functions.

In FIG. 4 the profile of the physical (i.e. actual) actuating position x of the window pane 2 is plotted against time t and is compared with the corresponding profile of the actuating position measurement x' calculated using the revolution rate of the motor for lifting the window pane 2. It can be seen from said representation that the actuating motor 3 is switched off by the control unit 12 at a switch-off point in time $t_A$ at which the actuating position measurement x' exceeds the switch-off position $x'_A$. Following the switching off, owing to its mechanical inertia the actuating motor 3 continues to run on by an actuating displacement interval that is referred to as the overrun $x'_N$ of the actuating motor 3. The overrun $x'_N$ is the larger here, the greater is the revolution rate n at the switch-off point in time $t_A$.

Owing to its own mechanical inertia as well as the elasticity of the actuating mechanism 4, as a rule the window pane 2 also runs on following the actuating motor 3 stopping by a small actuating displacement interval that is referred to as the overrun $x_N$ of the window pane 2. The window pane 2 thus actually stops at an end position $x_E$ that is given by the switch-off position $x'_A$ plus the overrun $x'_N$ of the actuating motor 3 and the overrun $x_N$ of the window pane 2:

$$x_E = x'_A + x'_N + x_N$$

The base term D of the lead $x_V$ is now selected such that it corresponds to the sum of the overrun $x'_N$ of the actuating motor 3 and the overrun $x_N$ of the window pane 2 ($D = x'_N + x_N$). Thus, when lifting the window pane 2, the overrun $x'_N$ of the actuating motor 3 and the overrun $x_N$ of the window pane 2 are just compensated by the lead $x_V$, whereby the end position $x_E$ corresponds to the desired target position $x_Z$ ($x_E = x_Z$). The lead $x_V$ is thus dimensioned such that the window pane 2 stops as accurately as possible at the target position $x_Z$.

Figure 5:
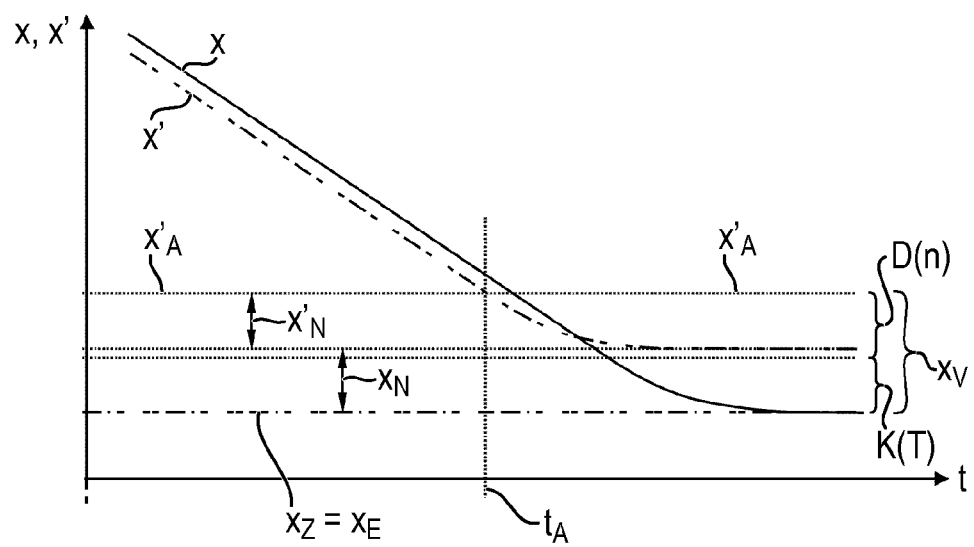
FIG. 5 shows the physical actuating position and the logical actuating position when lowering the window pane in a representation according to FIG. 4.

FIG. 5 shows the profile of the actuating position measurement x' and the physical actuating position x when lowering the window pane 2, wherein here too the actuating motor 3 is switched off at the switch-off point in time $t_A$ before the window pane 2 has reached its target position $x_Z$. It can be seen from FIGS. 4 and 5 that the overrun $x'_N$ of the actuating motor 3 is at least substantially independent of the actuation direction, but that the overrun $x_N$ of the window pane 2 is significantly greater when lowering (FIG. 5) than when lifting (FIG. 4). Said finding is taken into account by the control unit 12 by the same increasing the lead $x_V$ according to FIG. 5 by the correction term K. The correction term K is selected here such that the sum thereof with the base term D corresponds to the sum of the overrun $x'_N$ of the actuating motor 3 and the overrun $x_N$ of the window pane 2 ($D + K = x'_N + x_N$). Thus the overrun $x'_N$ of the actuating motor 3 and the overrun $x_N$ of the window pane 2 are also just compensated by the lead $x_V$ when lowering the window pane 2, so that the end position $x_E$ again corresponds to the desired target position $x_z$ ($x_E = x_Z$) and the window pane 2 stops as accurately as possible at the target position $x_Z$.

Although the invention in the described exemplary embodiment is particularly significant, it is not restricted to said embodiment. Rather, other embodiments of the invention can be derived from the above description by the person skilled in the art.

REFERENCE CHARACTER LIST

1 window lifter
2 (vehicle) window pane
3 actuating motor
4 actuating mechanism
5 actuation distance
6 open position
7 closed position
8 motor shaft
9 drive worm
10 worm wheel
12 control unit
13 angular position sensor
14 temperature sensor
x actuating position
$S_H$ pulse signal
x' actuating position measurement
n revolution rate
T (temperature) measurement value
$U_M$ operating voltage
$U_B$ battery voltage
$x'_A$ switch-off position
$x_Z$ target position
$x_V$ lead
D base term
K correction term
$n_{min}$ limit value
$n_{max}$ limit value
$T_{min}$ temperature limit
$T_{max}$ temperature limit
t time
$t_A$ switch-off point
$x'_N$ overrun
$x_N$ overrun
$x_E$ end position

The invention claimed is:

1. A method for operating a motorized actuating device for a selectively liftable and lowerable vehicle part, the method which comprises:
    moving the selectively liftable and lowerable vehicle part towards a target position by energizing an actuating motor of the actuating device;
    stopping the actuating motor of the actuating device at a predetermined lead before reaching the target position of the vehicle part;
    varying the lead in dependence on a rotary speed of the motor or an actuation rate measurement variable correlated with the rotary speed of the motor and in dependence on a temperature measurement variable characteristic of an ambient temperature of the actuating device;
    upon lowering the vehicle part, increasing the lead relative to a corresponding lead value when lifting by a correction term that is dependent on the temperature measurement variable.

2. The method according to claim 1, which comprises also varying the lead in dependence on an actuation direction.

3. A computer program product, comprising computer-readable instructions stored in non-transitory form for carrying out the following method steps upon being executed in a microcontroller-based control unit of a motorized actuating device for adjusting a selectively liftable and lowerable vehicle part;
    moving the selectively liftable and lowerable vehicle part towards a target position by energizing said electric actuating motor of the actuating device;
    stopping said electric actuating motor of the actuating device at a predetermined lead before reaching the target position of the vehicle part;

varying the lead in dependence on a rotary speed of said electric actuating motor or an actuation rate measurement variable correlated with the rotary speed of said electric actuating motor and in dependence on a temperature measurement variable characteristic of an ambient temperature of the actuating device upon lowering the vehicle part, increasing the lead relative to a corresponding lead value when lifting by a correction term that is dependent on the temperature measurement variable.

\* \* \* \* \*